US011263624B2

(12) United States Patent
John et al.

(10) Patent No.: US 11,263,624 B2
(45) Date of Patent: Mar. 1, 2022

(54) SYSTEM, METHOD, AND APPARATUS FOR AUTOMATICALLY ENCODING DATA IN AN ELECTRONIC COMMUNICATION

(71) Applicant: Visa International Service Association, San Francisco, CA (US)

(72) Inventors: Rhidian Desmond Thomas John, Helen's Bay (GB); Bartlomiej Piotr Prokop, Belfast (GB); Sean Robert Maurice Mathe, Woodley (GB); Michael Palmer, Lower Earley (GB); Mary-Claire Graham, San Francisco, CA (US); Fiachra Murray, San Francisco, CA (US); Nicola McCartan, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/386,623

(22) Filed: Apr. 17, 2019

(65) Prior Publication Data
US 2019/0244196 A1 Aug. 8, 2019

Related U.S. Application Data

(63) Continuation-in-part of application No. PCT/US2017/057971, filed on Oct. 24, 2017.

(51) Int. Cl.
*G06Q 20/38* (2012.01)
*H04L 9/08* (2006.01)
(Continued)

(52) U.S. Cl.
CPC ....... *G06Q 20/3827* (2013.01); *G06Q 20/085* (2013.01); *G06Q 20/24* (2013.01);
(Continued)

(58) Field of Classification Search
CPC .... G06Q 20/24; G06Q 20/08; G06Q 20/3827; G10L 15/26
See application file for complete search history.

(56) References Cited

U.S. PATENT DOCUMENTS 9,412,103 B1 * 8/2016 d'Escragnolle ...... G06Q 30/016
9,940,930 B1 * 4/2018 Campbell ............... G10L 15/22
(Continued)

FOREIGN PATENT DOCUMENTS

CA 2562964 * 10/2005 ......... G06K 9/00006
CA 2542068 * 10/2006 ............. G06Q 20/10
(Continued)

OTHER PUBLICATIONS

Paul Henderson, Voiceprint Vault, 2013, Graduate School of the University of Texas, Master's Thesis (Year: 2013).*
(Continued)

*Primary Examiner* — Patrick Mcatee
*Assistant Examiner* — Terry Nathan Murray
(74) *Attorney, Agent, or Firm* — The Webb Law Firm

(57) ABSTRACT

Provided is a computer-implemented method for automatically encoding data in an electronic communication. The method includes the steps of receiving an electronic communication including textual data, the textual data including account data inputted with a microphone and processed with a speech recognition system, in response to receiving the electronic communication, automatically processing the textual data, identifying the account data based on processing the textual data, generating at least one token, wherein the at least one token is unique to the account data, generating a modified electronic communication based at least partially on the textual data and the at least one token, the modified electronic communication comprising the at least one token, and communicating the modified electronic communication
(Continued)

to a recipient system. A system and computer program product for automatically encoding data in an electronic communication are also disclosed.

10 Claims, 5 Drawing Sheets

(51) Int. Cl.
| | |
|---|---|
| G06Q 20/32 | (2012.01) |
| G06Q 20/40 | (2012.01) |
| G06Q 20/36 | (2012.01) |
| H04L 67/563 | (2022.01) |
| H04L 9/06 | (2006.01) |
| G06Q 20/08 | (2012.01) |
| G06Q 20/24 | (2012.01) |
| G06Q 30/00 | (2012.01) |
| G10L 15/26 | (2006.01) |

(52) U.S. Cl.
CPC ......... *G06Q 20/32* (2013.01); *G06Q 20/3272* (2013.01); *G06Q 20/36* (2013.01); *G06Q 20/382* (2013.01); *G06Q 20/40* (2013.01); *G06Q 30/016* (2013.01); *G10L 15/26* (2013.01); *H04L 9/0643* (2013.01); *H04L 9/0869* (2013.01); *H04L 67/2814* (2013.01); *H04L 2209/56* (2013.01)

(56) References Cited

U.S. PATENT DOCUMENTS

| | | | |
|---|---|---|---|
| 10,205,709 B2 * | 2/2019 | John | H04L 9/0891 |
| 2005/0045732 A1 | 3/2005 | Whitaker | |
| 2008/0256613 A1 * | 10/2008 | Grover | G10L 15/26 726/5 |
| 2012/0041881 A1 * | 2/2012 | Basu | G06Q 20/02 705/67 |
| 2012/0136780 A1 * | 5/2012 | El-Awady | G06Q 20/102 |
| 2015/0248664 A1 | 9/2015 | Makhdumi et al. | |
| 2016/0057139 A1 * | 2/2016 | McDonough | H04L 63/0861 |
| 2016/0086169 A1 | 3/2016 | Jodoin et al. | |
| 2016/0330172 A1 * | 11/2016 | Muttik | H04L 63/0281 |
| 2018/0033075 A1 * | 2/2018 | Chen | G06Q 10/083 |
| 2018/0082050 A1 * | 3/2018 | Flink | G06F 21/32 |

FOREIGN PATENT DOCUMENTS

| | | | | |
|---|---|---|---|---|
| WO | 2015145335 A2 | 10/2015 | | |
| WO | WO2015145335 | * | 10/2015 | G06Q 20/32 |

OTHER PUBLICATIONS

Qinghan Xiao, Trusted User Authentication Using Biometrics, 2002, Defence R&D Canada, Technical Memorandum (Year: 2002).*
Javier Ortega-Garcia, Authentication gets Personal, 2004, Halmstad University Post-Print (Year: 2004).*

* cited by examiner

SYSTEM, METHOD, AND APPARATUS FOR AUTOMATICALLY ENCODING DATA IN AN ELECTRONIC COMMUNICATION

CROSS-REFERENCE TO RELATED APPLICATIONS

This application is a continuation-in-part of International Application No. PCT/US17/57971, designating the United States and filed on Oct. 24, 2017, the entirety of which is hereby incorporated by reference.

BACKGROUND OF THE INVENTION

1. Field of the Invention

This invention relates generally to encoding data and, in one particular embodiment, to a system, method, and apparatus for automatically encoding data in an electronic communication.

2. Technical Considerations

Organizations are often required to protect and restrict access to sensitive customer information. For example, laws, regulations, and internal operating procedures may require entities to protect and restrict access to sensitive account data that could be used to commit fraudulent transactions. Some entities that communicate with customers, such as customer service representatives, may electronically receive sensitive account data from customers seeking help or support. In such circumstances, providing the account data to the customer service representative may breach the confidentiality of the data. For example, a chat transcript with a customer service representative may be logged and stored without adequate protection. However, without being able to identify a particular customer account, the customer service representative may be unable to provide the requested assistance.

Currently, customer service representatives must warn customers to not input sensitive account data. Not only is this method reliant on textual warnings that may go unnoticed, but it does not address the need for customer service representatives to identify the account data to assist the customer. Systems that mask sensitive account data, such as by replacing the sensitive account data with asterisks or special characters, obscures the sensitive account data in a manner that cannot be used to uniquely identify the sensitive account data. Likewise, logged transcripts without any identification of the account data cannot be utilized to address issues after the customer communication occurs.

SUMMARY OF THE INVENTION

Accordingly, it is an object of the present invention to provide a system, method, and apparatus for automatically encoding data in an electronic communication that overcomes some or all of the deficiencies of the prior art.

According to a non-limiting embodiment, provided is a computer-implemented method for automatically encoding data in an electronic communication, comprising: receiving, with at least one processor, an electronic communication comprising textual data, the textual data including account data inputted with a microphone and processed with a speech recognition system; in response to receiving the electronic communication, automatically processing, with at least one processor, the textual data; identifying, with at least one processor, the account data based on processing the textual data; generating, with at least one processor, at least one token, wherein the at least one token is unique to the account data; generating, with at least one processor, a modified electronic communication based at least partially on the textual data and the at least one token, the modified electronic communication comprising the at least one token; and communicating the modified electronic communication to a recipient system.

In non-limiting embodiments, the method further comprises generating the textual data by processing a speech input from a user with the speech recognition system. The method may also further comprise prompting the user, through a client device, to provide the speech input. In some examples, the method may further comprise prompting a user, through a client device, to provide a first speech input; authenticating the user based on the first speech input; in response to authenticating the user, prompting the user, through the client device, to provide a second speech input; and generating the textual data by processing the second speech input with a speech recognition system.

In non-limiting embodiments, the method may further include storing, in at least one database, the at least one token and the account data. In some non-limiting examples, the recipient system comprises a customer service system. In some non-limiting examples, the electronic communication is a chat message. Further, in some non-limiting embodiments, the same at least one processor receives the electronic communication, automatically processes the textual data to identify the account data, generates the at least one token, and generates the modified electronic communication. In some non-limiting embodiments, generating the at least one token comprises generating a random value or hashing the account data. In some non-limiting embodiments, generating the at least one token comprises querying a database based on the account data to identify a copy of the at least one token that was previously generated. In some non-limiting embodiments, the method further comprises receiving, from the recipient system, a transaction request comprising the at least one token; querying at least one database based at least partially on the at least one token to identify the account data; and processing a transaction based at least partially on the transaction request and the account data. In some non-limiting examples, the account data comprises a Primary Account Number (PAN) associated with a payment card.

According to another non-limiting embodiment, provided is a system for automatically encoding data in an electronic communication, comprising at least one processor programmed or configured to: receive an electronic communication comprising textual data, the textual data including account data inputted with a microphone and processed with a speech recognition system; in response to receiving the electronic communication, automatically process the textual data; identify the account data based on processing the textual data; generate at least one token, wherein the at least one token is unique to the account data; generate a modified electronic communication based at least partially on the textual data and the at least one token, the modified electronic communication comprising the at least one token; and communicate the modified electronic communication to a recipient system.

In non-limiting embodiments, the at least one processor is further programmed or configured to generate the textual data by processing a speech input from a user with the speech recognition system. In non-limiting embodiments, the at least one processor is further programmed or configured to prompt the user, through a client device, to provide the speech input. In non-limiting embodiments, the at least one processor is further programmed or configured to prompt a user, through a client device, to provide a first speech input; authenticate the user based on the first speech input; in response to authenticating the user, prompt the user, through the client device, to provide a second speech input; and generate the textual data by processing the second speech input with a speech recognition system.

In non-limiting embodiments, the system further comprises at least one database, and the at least one processor is further programmed or configured to store, in the at least one database, the at least one token and the account data. In some non-limiting examples, the recipient system comprises a customer service system. In some non-limiting examples, the electronic communication is a chat message. Further, in some non-limiting embodiments, the system includes at least one server computer, the at least one processor comprises at least one first processor and at least one second processor, the at least one server computer comprises the at least one first processor, and at least one client device comprises the at least one second processor. In some non-limiting embodiments, generating the at least one token comprises generating a random value or hashing the account data. In some non-limiting embodiments, generating the at least one token comprises querying a database based on the account data to identify a copy of the at least one token that was previously generated. In non-limiting embodiments, the at least one processor is further programmed or configured to: receive, from the recipient system, a transaction request comprising the at least one token; query at least one database based at least partially on the at least one token to identify the account data; and process a transaction based at least partially on the transaction request and the account data. In some non-limiting examples, the account data comprises a primary account number (PAN) associated with a payment card.

According to a further non-limiting embodiment, provided is a computer program product for automatically encoding data in an electronic communication, comprising at least one non-transitory computer-readable medium including program instructions that, when executed by at least one processor, cause the at least one processor to: receive an electronic communication comprising textual data, the textual data including account data inputted with a microphone and processed with a speech recognition system; in response to receiving the electronic communication, automatically process the textual data; identify the account data based on processing the textual data; generate at least one token, wherein the at least one token is unique to the account data; generate a modified electronic communication based at least partially on the textual data and the at least one token, the modified electronic communication comprising the at least one token; and communicate the modified electronic communication to a recipient system.

In non-limiting embodiments, the at least one token is generated by generating a random value or hashing the account data. In non-limiting embodiments, the program instructions, when executed by the at least one processor, further cause the at least one processor to: receive, from the recipient system, a transaction request comprising the at least one token; query at least one database based at least partially on the at least one token to identify the account data; and process a transaction based at least partially on the transaction request and the account data.

Further preferred and non-limiting embodiments or aspects are set forth in the following numbered clauses.

Clause 1: A computer-implemented method for automatically encoding data in an electronic communication, comprising: receiving, with at least one processor, an electronic communication comprising textual data, the textual data including account data; in response to receiving the electronic communication, automatically processing, with at least one processor, the textual data; identifying, with at least one processor, the account data based on processing the textual data; generating, with at least one processor, at least one token, wherein the at least one token is unique to the account data; generating, with at least one processor, a modified electronic communication based at least partially on the textual data and the at least one token, the modified electronic communication comprising the at least one token; and communicating the modified electronic communication to a recipient system.

Clause 2: The computer-implemented method of clause 1, further comprising storing, in at least one database, the at least one token and the account data.

Clause 3: The computer-implemented method of clauses 1 or 2, wherein the recipient system comprises a customer service system.

Clause 4: The computer-implemented method of any of clauses 1-3, wherein the electronic communication is a chat message.

Clause 5: The computer-implemented method of any of clauses 1-4, wherein the same at least one processor receives the electronic communication, automatically processes the textual data to identify the account data, generates the at least one token, and generates the modified electronic communication.

Clause 6: The computer-implemented method of any of clauses 1-5, wherein generating the at least one token comprises generating a random value or hashing the account data.

Clause 7: The computer-implemented method of any of clauses 1-6, wherein generating the at least one token comprises querying a database based on the account data to identify a copy of the at least one token that was previously generated.

Clause 8: The computer-implemented method of any of clauses 1-7, further comprising: receiving, from the recipient system, a transaction request comprising the at least one token; querying at least one database based at least partially on the at least one token to identify the account data; and processing a transaction based at least partially on the transaction request and the account data.

Clause 9: The computer-implemented method of any of clauses 1-8, wherein the account data comprises a primary account number (PAN) associated with a payment card.

Clause 10: A system for automatically encoding data in an electronic communication, comprising at least one processor programmed or configured to: receive an electronic communication comprising textual data, the textual data including account data; in response to receiving the electronic communication, automatically process the textual data; identify the account data based on processing the textual data; generate at least one token based at least partially on the account data, wherein the at least one token is unique to the account data; generate a modified electronic communication based at least partially on the textual data and the at least one token, the modified electronic communication comprising the at least one token; and communicate the modified electronic communication to a recipient system.

Clause 11: The system of clause 10, further comprising at least one database, the at least one processor further programmed or configured to store, in the at least one database, the at least one token and the account data.

Clause 12: The system of clauses 10 or 11, wherein the recipient system comprises a customer service system.

Clause 13: The system of any of clauses 10-12, wherein the electronic communication is a chat message.

Clause 14: The system of any of clauses 10-13, further comprising at least one server computer, wherein the at least one processor comprises at least one first processor and at least one second processor, wherein the at least one server computer comprises the at least one first processor, and wherein at least one client device comprises the at least one second processor.

Clause 15: The system of any of clauses 10-14, wherein the at least one processor generates the at least one token by generating a random value or hashing the account data.

Clause 16: The system of any of clauses 10-15, wherein the at least one processor generates the at least one token by querying a database based on the account data to identify a copy of the at least one token that was previously generated.

Clause 17: The system of any of clauses 10-16, wherein the at least one processor is further programmed or configured to: receive, from the recipient system, a transaction request comprising the at least one token; query at least one database based at least partially on the at least one token to identify the account data; and process a transaction based at least partially on the transaction request and the account data.

Clause 18: The system of any of clauses 10-17, wherein the account data comprises a primary account number (PAN) associated with a payment card.

Clause 19: A computer program product for automatically encoding data in an electronic communication, comprising at least one non-transitory computer-readable medium including program instructions that, when executed by at least one processor, cause the at least one processor to: receive an electronic communication comprising textual data, the textual data including account data; in response to receiving the electronic communication, automatically process the textual data; identify the account data based on processing the textual data; generate at least one token based at least partially on the account data, wherein the at least one token is unique to the account data; generate a modified electronic communication based at least partially on the textual data and the at least one token, the modified electronic communication comprising the at least one token; and communicate the modified electronic communication to a recipient system.

Clause 20: The computer program product of clause 19, wherein the at least one processor generates the at least one token by generating a random value or hashing the account data.

Clause 21: The computer program product of clauses 19 or 20, wherein the program instructions, when executed by the at least one processor, further cause the at least one processor to: receive, from the recipient system, a transaction request comprising the at least one token; query at least one database based at least partially on the at least one token to identify the account data; and process a transaction based at least partially on the transaction request and the account data.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
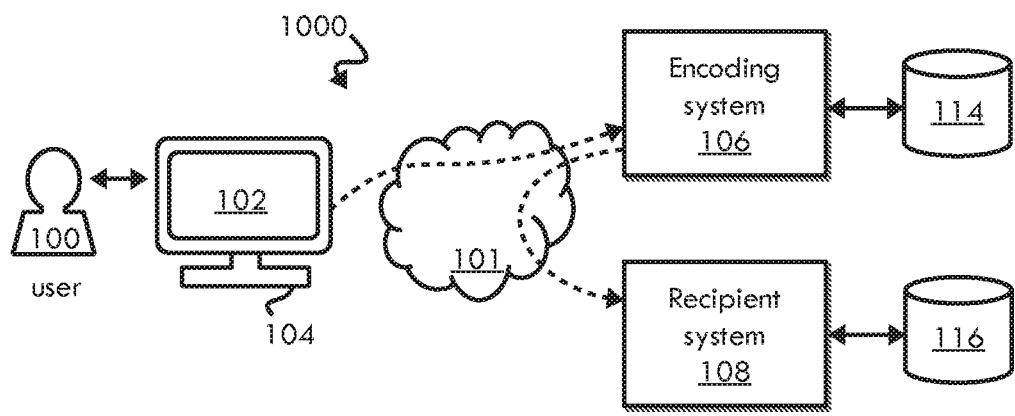
FIG. 1 is a schematic diagram of a system for automatically encoding data in an electronic communication according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

Non-limiting embodiments of the present invention are directed to a system, method, and computer program product for automatically encoding data in an electronic communication. An electronic communication may be received, parsed, and modified such that sensitive account data, such as a primary account number (PAN), is identified and encoded before the electronic communication is transmitted to a recipient system, such as a customer service representative system. The encoded sensitive account data (e.g., token) may be unique to the sensitive account data such that it can be used by the recipient to troubleshoot and/or address any problems or issues being experienced by the customer. In non-limiting examples, an electronic communication is captured during a real-time chat communication between a user and a customer service agent. The electronic communication is processed to identify sensitive account data that may have been inputted into the electronic communication by the user, such as account identifiers, passwords, PIN codes, and/or the like. In response to identifying the sensitive account data, one or more unique tokens corresponding to the account data may be generated and/or identified. In some examples, a tokenization engine is used to generate a token based on the sensitive account data. The electronic communication is then modified with the token(s) and communicated to the recipient (e.g., customer service agent). The customer service agent is then able to resolve and troubleshoot the user's request based on the token(s) without having received the sensitive account data. Non-limiting embodiments of the invention provide an improved communications architecture by filtering electronic communications through an encoding system before reaching a customer service agent or other intended recipient system. In some non-limiting embodiments, the encoding system may be hosted by a transaction processing system, issuer system, payment gateway, electronic wallet provider, and/or any other entity.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "server" may refer to or include one or more processors or computers, storage devices, and/or similar computer arrangements that are operated by or facilitate communication and processing for multiple parties in a network environment, such as the Internet, although it will be appreciated that communication may be facilitated over any public or private network environments and that various other arrangements are possible. Further, multiple computers, e.g., servers, or other computerized devices, e.g., point-of-sale devices, directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems, computing devices, software applications, and/or the like operated by or on behalf of an issuer institution, such as a server computer executing one or more software applications. For example, an issuer system may include one or more authorization servers for authorizing a transaction. An issuer institution may be associated with a bank identification number (BIN) or other unique identifier that uniquely identifies it among other issuer institutions.

As used herein, the term "acquirer institution" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computing devices, software applications, and/or the like operated by or on behalf of an acquirer institution.

As used herein, the term "merchant" may refer to an individual or entity that provides goods and/or services, or access to goods and/or services, to users (e.g., customers) based on a transaction (e.g., a payment transaction). The term "merchant system" may refer to one or more computer systems, computing devices, and/or software applications operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

The term "client device," as used herein, refers to any electronic device that is configured to communicate with one or more remote devices or systems, such as a server. A client device may include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point-of-sale (POS) system, and/or any other device, system, and/or software application configured to communicate with a remote device or system.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "customer service agent" may refer to a human or computer that interacts with a customer. A customer service agent may include an automated bot, a human representative, and/or a combination of automated bot(s) and human(s).

Referring now to FIG. 1, a system 1000 for automatically encoding data in an electronic communication is shown according to a non-limiting embodiment. A client device 104 operated by a user 100 is in communication with an encoding system 106 via network 101. The client device 104 includes a graphical user interface (GUI) 102 that the user 100 interacts with. The GUI 102 may include, for example, a webpage associated with a merchant or payment gateway. In some non-limiting embodiments, the GUI 102 may be a customer service webpage through which the user 100 engages in real-time communication with a customer service agent. It will be appreciated that, in other examples, the communication may be asynchronous such as a help request form that is completed by the user without an expectation for an immediate response.

With continued reference to FIG. 1, the encoding system 106 may include one or more server computers having one or more processors. The encoding system 106 may also be a subsystem or component of another system, such as a transaction processing server, an issuer system, a payment gateway, a recipient system 108, and/or the like. For example, the encoding system 106 may include one or more software applications that execute on a server computer. In other non-limiting embodiments, some or all of the encoding system 106 may reside on the client device 104 and/or some other client-side system or device. The encoding system 106 is in communication with an account database 114 and recipient system 108. The account database 114 may include customer account data such as, for example, account identifiers corresponding to customer accounts.

The recipient system 108 may include a customer service agent system, a merchant system, a third-party support system, and/or any other system for receiving an electronic communication from the client device 104. The recipient system 108 may include, for example, one or more computer terminals operated by one or more customer service agents. The recipient system 108 may further include a web browser or special-purpose software application for enabling customer service agents to communicate with users. It will be appreciated that numerous other systems and/or entities may be involved in the system 1000 shown in FIG. 1. For example, some communications may pass through and/or be processed by a payment gateway, acquirer system, issuer system, merchant system, transaction processing system, electronic wallet provider system, and/or the like.

Still referring to FIG. 1, the network 101 may include one or more private and/or public networks such as, but not limited to, the Internet. It will be appreciated that one or more networks and/or communication channels may be used for communication between various components of the system 1000. For example, the client device 104 may communicate with the encoding system 106 through the same or different network through which the encoding system 106 communicates with the recipient system 108. In non-limiting embodiments, a first communication channel is established between the client device 104 and the encoding system 106, and a second communication channel is established between the encoding system 106 and the recipient system 108 such that the client device 104 does not have a direct connection with the recipient system 108. For example, an HTTP connection may be established between a client application (e.g., a web browser, a special-purpose application, etc.) executing on the client device 104 and the encoding system 106, and another, separate HTTP connection may be established between the encoding system 106 and a client application (e.g., a web browser, a special-purpose application, etc.) executing on the recipient system 108. Various other arrangements and protocols are possible.

In operation, an electronic communication including textual data is received by the client device 104 from the user 100. The electronic communication is communicated from the client device 104 to the encoding system 106. The textual data may be inputted by the user through an input device such as a keyboard, mouse, touchscreen, and/or microphone and speech recognition software, or in any other like manner. The encoding system 106 processes the textual data to determine if the textual data includes any sensitive account data (e.g., an account identifier, a PIN, a password, and/or the like). The textual data may be processed by parsing a string representation of the textual data to identify a pattern of characters. In response to determining that sensitive account data is identified in the textual data, the encoding system 106 encodes the account data by generating one or more tokens based on the sensitive account data (e.g., an account identifier, a PIN, a password, and/or the like) and/or any other account or transaction data (e.g., customer name, address, password, PIN, and/or the like). The textual data received from the client device 104 is then modified by the encoding system 106 to include the one or more tokens in place of the sensitive account data. For example, the encoding system 106 may delete some or all of the sensitive account data from the textual data and replace it with the one or more tokens. The encoding system 106 then communicates the modified textual data to the recipient system 108. The recipient system 108 may store the modified textual data in the recipient database 116.

Figure 2:
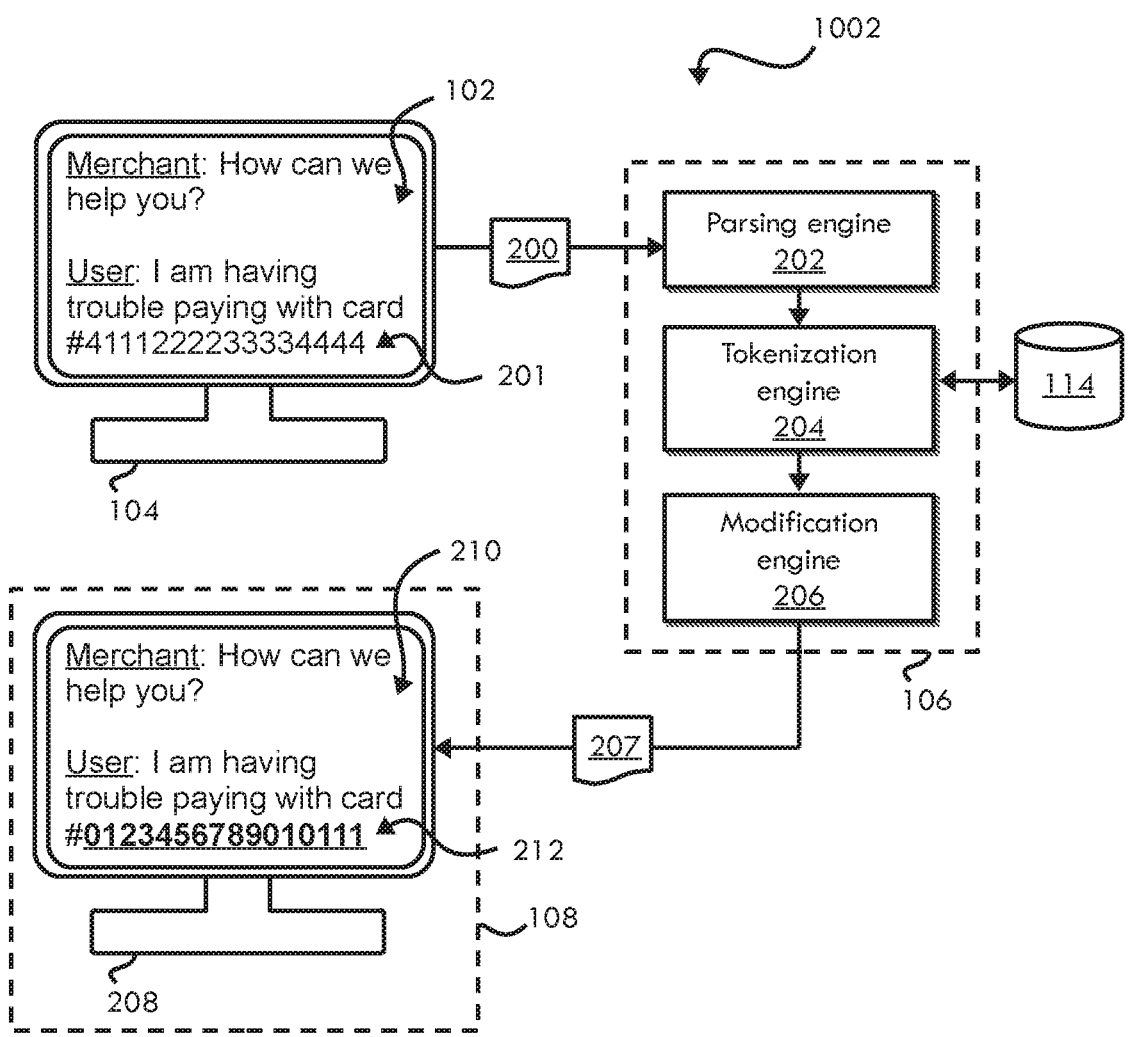
FIG. 2 is a schematic diagram of a system for automatically encoding data in an electronic communication according to a non-limiting embodiment.

Referring now to FIG. 2, a system 1002 for automatically encoding data in an electronic communication is shown according to a non-limiting embodiment. A client device 104 displays a GUI 102 including a chat dialogue with a customer service agent ("merchant") and a user ("user"). As shown on the GUI 102, the user inputted an account identifier 201 (in this example, a PAN) into the chat dialogue. The electronic communication 200 including textual data from the chat dialogue is communicated to an encoding system 106. The encoding system 106 may be local or remote to the client device 104. The encoding system 106 includes a parsing engine 202, tokenization engine 204, and modification engine 206. The parsing engine 202, tokenization engine 204, and modification engine 206 may include individual or separate components of hardware and/or software. For example, the parsing engine 202, tokenization engine 204, and modification engine 206 may include individual or separate software applications executing on one or more server computers. The parsing engine 202, tokenization engine 204, and modification engine 206 may also be separate or integrated software routines of a software application stored on a computer-readable medium.

With continued reference to FIG. 2, the parsing engine 202 may receive, as an input, at least a portion of the electronic communication 200 including textual data from the client device 104. The parsing engine 202 then parses the textual data to identify sensitive account data, such as the account identifier 201. One or more rules may be defined to identify the sensitive account data based on, for example, the number of digits appearing in the textual data, inclusion of a Bank Identification Number (BIN), a string of digits or characters followed or preceded by one or more keywords (e.g., "my credit card number is," "is my card number," "my password is," or the like), and/or any other predefined or user defined rules. As an example, the parsing engine 202 may iterate through sequential characters of a string of textual data and count successive numerals (e.g., without spaces or dashes). Account identifiers may be sixteen (16) digits, as an example, and may therefore be identified when a count of successive digits reaches sixteen (16). A regular expression (e.g., "regex") string search function may also be used. In other examples, the sensitive account data may be identified based on a tagged data input field (e.g., an input field on a webpage that specifically calls for sensitive account data). It will be appreciated that various other techniques may be employed to identify sensitive account data in an electronic communication.

Still referring to FIG. 2, the parsing engine may output the textual data and an identification of the sensitive account data. For example, the parsing engine 202 may output a string of characters representing the textual data and one or more values indicating where in the string (e.g., a numerical range of characters in an array) the sensitive account data is located. In other examples, the parsing engine 202 may output a first string representing the textual data with the sensitive account data removed or replaced with a known value, and a second string representing the sensitive account data. It will be appreciated that various other outputs are possible. The tokenization engine 204 receives the output from the parsing engine 202 and generates one or more tokens. The one or more tokens are stored in the account database corresponding to the sensitive account data.

Tokens may include one or more strings of binary, alphanumeric, hexadecimal, and/or other data representations. It will be appreciated that tokens may be arranged in any manner and/or type of data structure. Tokens may be generated in various ways. For example, a token may be generated by generating a random value having a predefined format. Tokens may also be generated based on the output of the parsing engine 202, such as the sensitive account data. For example, the sensitive account data (e.g., account identifier 201) may be hashed with one or more values (e.g., a portion of the account data, a key, a key specific to the merchant, a key specific to the recipient system, and/or the like) to generate a token. In non-limiting embodiments, a token may be generated by hashing two or more values together using one or more one-way hash functions, such as but not limited to a Secure Hash Algorithm (SHA). In other non-limiting embodiments, tokens may be generated based on a reversible encryption algorithm. It will be appreciated that tokens may be generated in various other ways.

In non-limiting embodiments, the token is generated in a predefined manner such that the same sensitive account data will always result in the same token. In non-limiting embodiments, the token is generated based on an identifier or other value unique to the recipient system 108, a related merchant, and/or other entity. In other non-limiting embodiments, the token may be generated based on other data, such as global variables, such that it is unique to the sensitive account data and/or user across all participating recipient systems. In some non-limiting embodiments, the token may be randomly generated and stored in the account database 114 corresponding to the sensitive account data. In some non-limiting embodiments, the token may be preexisting in the account database 114 or some other database such that generating the token involves querying the account database 114 based on the sensitive account data or some other portion of the textual data and identifying an existing token from the account database 114 that corresponds to that query. Once one or more tokens are generated, they are stored in the account database 114 such that the tokens can be used to query the database 114 for the sensitive account data.

With continued reference to FIG. 2, the tokenization engine 204 may output one or more tokens and the textual data to the modification engine 206. The modification engine 206 may include one or more software functions that receive the one or more tokens and the textual data as inputs and generate, based on those inputs, a modified electronic communication 207. The modification engine 206 may replace the sensitive account data in the original textual data with the one or more tokens generated by the tokenization engine 204. In this manner, the modification engine 206 generates a modified electronic communication 207 that does not expose the sensitive account data to the recipient, while allowing the recipient to reference the sensitive account data using the one or more tokens. The modified electronic communication 207 is output by the modification engine 206 and communicated to a recipient system 108 including a customer service agent terminal 208. The recipient system 108 then displays a customer service agent GUI 210 that includes the modified electronic communication with a token 212 replacing the sensitive account data (e.g., the account identifier 201). The recipient system 108 may store the token 212 corresponding to the user in a recipient database (e.g., recipient database 116 shown in FIG. 1). In this manner, the recipient system 108 may identify the token 212 in future electronic communications with the user and correlate the token 212 to past inquiries, incidents, or requests. In non-limiting embodiments, the recipient system 108 may initiate a financial transaction using the token 212.

Figure 3:
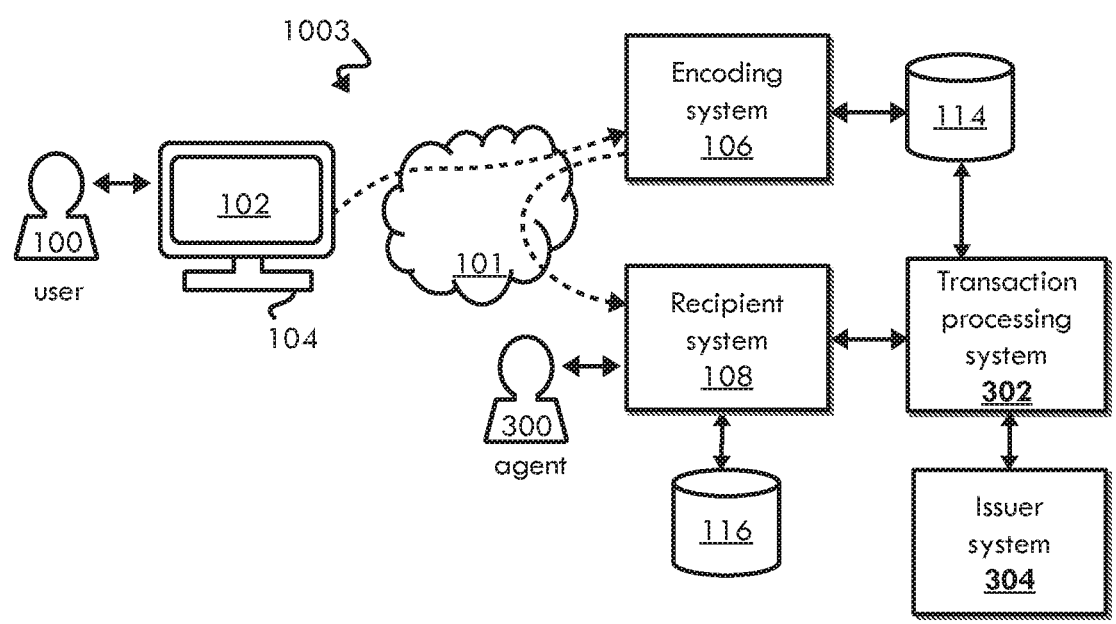
FIG. 3 is a schematic diagram of a system for automatically encoding data in an electronic communication according to a non-limiting embodiment.

Referring now to FIG. 3, a system 1003 is shown for automatically encoding account data in an electronic communication according to a non-limiting embodiment. In FIG. 3, the recipient system 108 is in communication with a transaction processing system 302. The transaction processing system 302 is in communication with the account database 114 (or another database including data from the account database 114) and an issuer system 304. It will be appreciated that the recipient system 108 may be in communication with the transaction processing system 302 via an acquirer system or payment gateway (not shown). A user 100 may communicate with a customer service agent 300 at a recipient system 108 to obtain assistance in making a purchase, obtaining a refund, and/or the like. The customer service agent 300, using the token received from the encoding system 108, may generate and communicate a transaction request message including the token to the transaction processing system 302. The transaction processing system 302 may then query the account database 114 based on the token to determine an account identifier that corresponds to the token. The transaction processing system 302 may then process and/or complete the transaction using the account identifier by settling the transaction with the issuer system 304.

Figure 4:
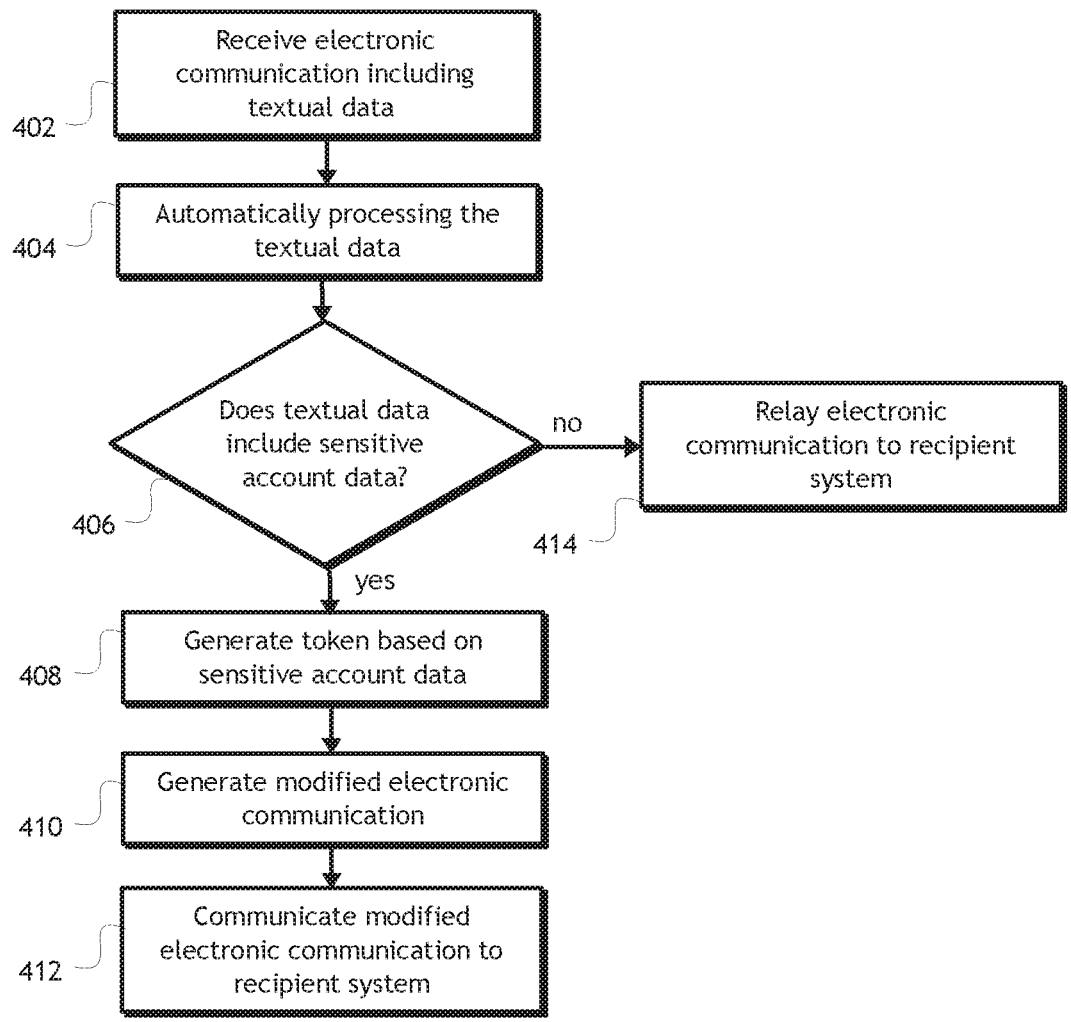
FIG. 4 is a flow diagram of a method for automatically encoding data in an electronic communication according to a non-limiting embodiment.

Referring now to FIG. 4, a flow diagram for a method of automatically encoding data in an electronic communication is shown according to a non-limiting embodiment. At a first step 402, an electronic communication is received by an encoding system. The electronic communication includes textual data, such as a user chat response or help request message. At step 404, the textual data, upon being received, is automatically processed. The textual data may be processed according to any technique, such as a parsing algorithm. At step 406, it is determined whether the textual data includes sensitive account data. If the textual data is determined to not include sensitive account data, the method proceeds to step 414 and the electronic communication is relayed to a recipient system without modification (e.g., with the original textual data). If, at step 406, it is determined that the textual data does include sensitive account data, the method proceeds to step 408 and a token is generated based on the sensitive account data and/or other inputs. At step 410 a modified electronic communication is generated based on the token such that the token replaces the sensitive account data in the textual data of the electronic communication. At step 412, the modified electronic communication is communicated to a recipient system, such as a customer service agent terminal.

In non-limiting embodiments, the electronic communication in which data is automatically encoded may include one of more log files of activities performed and/or data sent or received, such as application logs, web logs, chat transcripts, and/or the like. In such embodiments, the textual data that is recorded in a log may be processed in real-time while it is being recorded or may be processed after being recorded. For example, a software application may record a log of activity, such as communications and actions, over a period of time or for a particular session. Following that period of time or particular session, the textual data may be processed as described herein. In another example, the textual data may be processed as it is being captured by an application or service and recorded into a log. In this manner, users that have access to such logs for technical or business reasons can access the logs without being exposed to sensitive data and are able to recognize where sensitive data has been removed by the presence of one or more tokens. Logs may also be automatically annotated to identify where sensitive data has been removed.

Figure 5:
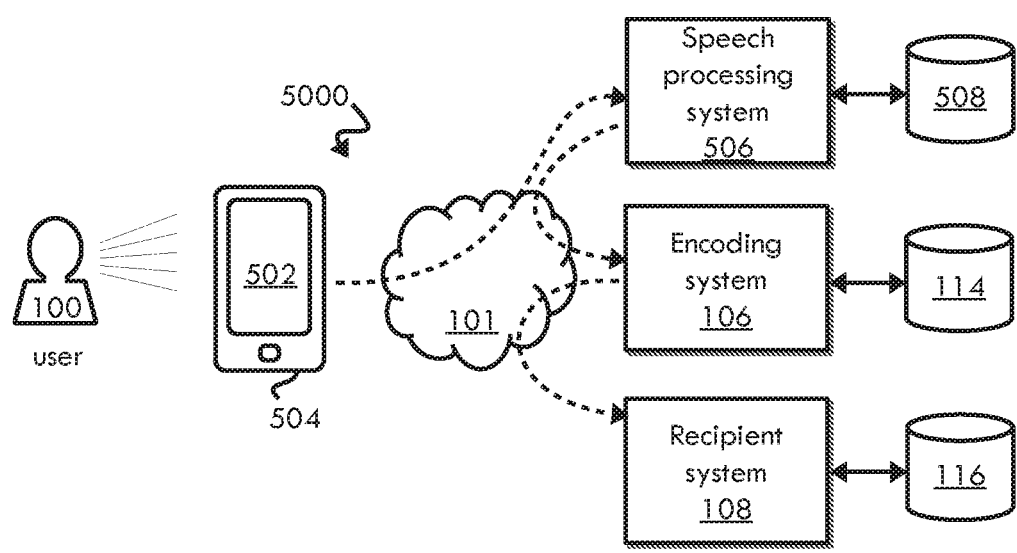
FIG. 5 is a schematic diagram of a system for automatically encoding data in an electronic communication according to a non-limiting embodiment.

Referring now to FIG. 5, a system 5000 for automatically encoding data in an electronic communication is shown according to another non-limiting embodiment. In the example in FIG. 5, a user 100 speaks into a client device 504 to conduct a transaction. The client device 504 is in communication with a speech processing system 506 and may display one or more GUIs 502. The speech processing system 506 may include one or more computing devices and/or software applications executable by one or more computing devices. The speech processing system 506 may receive audio data from the client device 504. In some non-limiting examples, the audio data may be raw audio data or compressed audio data captured by a microphone of the client device 504. In some non-limiting embodiments, the speech processing system 506 is configured to convert speech to a textual input using a speech recognition system, such as one or more speech recognition software applications. In other non-limiting embodiments, the client device 504 may convert the audio it receives to text and communicate the text to the speech processing system 506 for further processing.

With continued reference to FIG. 5, the speech processing system 504 or another system or device (e.g., issuer system, payment gateway, transaction processing system, and/or the like) may also authenticate the user 100 based on the speech input it receives. For example, the speech processing system 506 may generate a unique biometric key based on one or more parameters of the speech input it receives. In some examples, the user 100 may be prompted to recite a specific word or phrase. Based on the user's 100 speech including, but not limited to, the tempo, cadence, pitch, accent, pronunciation, and/or the like, a unique value may be generated. As an example, the unique value may be the output of one or more hash functions, calculations, and/or the like, based on the speech input. The generated biometric key may then be compared with one or more biometric keys stored for the user 100 or an account corresponding with the user in a speech database 508. The stored biometric keys may be generated in advance during a registration process with the user 100 and stored in the speech database 508. In some examples, the biometric keys may be stored with account tokens and stored in a token vault. If the biometric keys match, the speech processing system 506 may generate an authentication response message and communicate the authentication response message to the encoding system 106, recipient system 108, transaction processing system (not shown in FIG. 5), and/or issuer system (not shown in FIG. 5), as examples. It will be appreciated that, in non-limiting embodiments in which the authentication is performed by another system or device (e.g., a transaction processing system), the authentication response message may be transmitted to an issuer system or merchant system, as an example.

Still referring to FIG. 5, the speech processing system 506 may prompt the user 100 for an account identifier, such as a PAN, for conducting a transaction. It will be appreciated that the user 100 may also interact with a digital assistant application, such as, but not limited to, the client device 504 and/or an electronic wallet application on the client device 504 that prompts the user 100 for inputs regarding the transaction. As an example, the user 100 may be prompted to select an account to conduct a transaction. The user 100 may ask for the available accounts to choose from and the speech processing system 506, client device 504, and/or other component of the system 5000 may audibly or visually present a list of accounts that is known for the user 100 (e.g., "Visa card ending in 1234," "PNC bank card ending in 5678," and/or the like). In response to the user adding a new account, either to replace an existing account, use an additional account, and/or to initially register an account, the user 100 may be prompted to audibly recite (e.g., speak) the account identifier, expiration date, Card Verification Value (CVV) code, name, and billing address, as examples. The user 100 may be separately prompted for each item of information or, in other examples, the speech processing system 506 may parse a plurality of recitations. Such an arrangement is beneficial over a screen-reading system in which an automated bot recites the contents of a webpage, as important information (e.g., terms and conditions) that are located on the bottom of the screen may not be presented before the user inputs payment information. In non-limiting embodiments, important information can be conveyed to the user audibly prior to prompting the user for payment information.

The speech processing system 506 may also process the textual data it generates from the speech input according to one or more natural language processing algorithms. The speech processing system 506 and/or any other system may process the textual data representing words and/or phrases from the speech input to generate a query based on the words, user sentiment, context, previous interactions, and/or the like. This natural language understanding may be utilized to prompt the user for additional speech inputs, to correct potentially erroneous information, and/or to understand the manner in which the user 100 is providing the speech inputs (e.g., in sentence form with context).

With continued reference to FIG. 5, the speech processing system 506, after it receives an account identifier from a speech input from the user, may communicate the account identifier to the encoding system 106 to be encoded and communicated to the recipient system 108 as described herein. Although FIG. 5 shows the speech processing system 506 communicating through the network environment 101, it will be appreciated that a different communication network or channel may be used to securely communicate the account identifier prior to being encoded. In some non-limiting embodiments, the speech processing system 506 may be local to and/or incorporated with the encoding system 106 and, as a result, external communication of the account identifier may not be necessary between these components.

In non-limiting embodiments, and with continued reference to FIG. 5, a user 100 may be automatically prompted to update account information when accounts are about to expire, avoiding a scenario where the user 100 seeks to complete a purchase but the account on file is expired. Moreover, merchant systems may be registered with the system 5000 such that the user 100 can seamlessly move between merchant systems with the same accounts and speech key(s).

Still referring to FIG. 5, the speech processing system 506 may be integrated in a merchant system. In this manner, a merchant website may process a speech input from the user 100 to facilitate a voice-based transaction. In non-limiting examples in which the recipient system 108 includes a merchant system, the merchant system may also include the speech processing system 506. In some non-limiting examples, a merchant POS system may also integrate the speech processing system 506 to allow for a user to conduct a transaction at a physical retail location of the merchant. In such examples, privacy considerations may warrant the use of an account token that is derived from a PAN and is restricted to reduce the risk resulting from unintended exposure of the account identifier.

Figure 6:
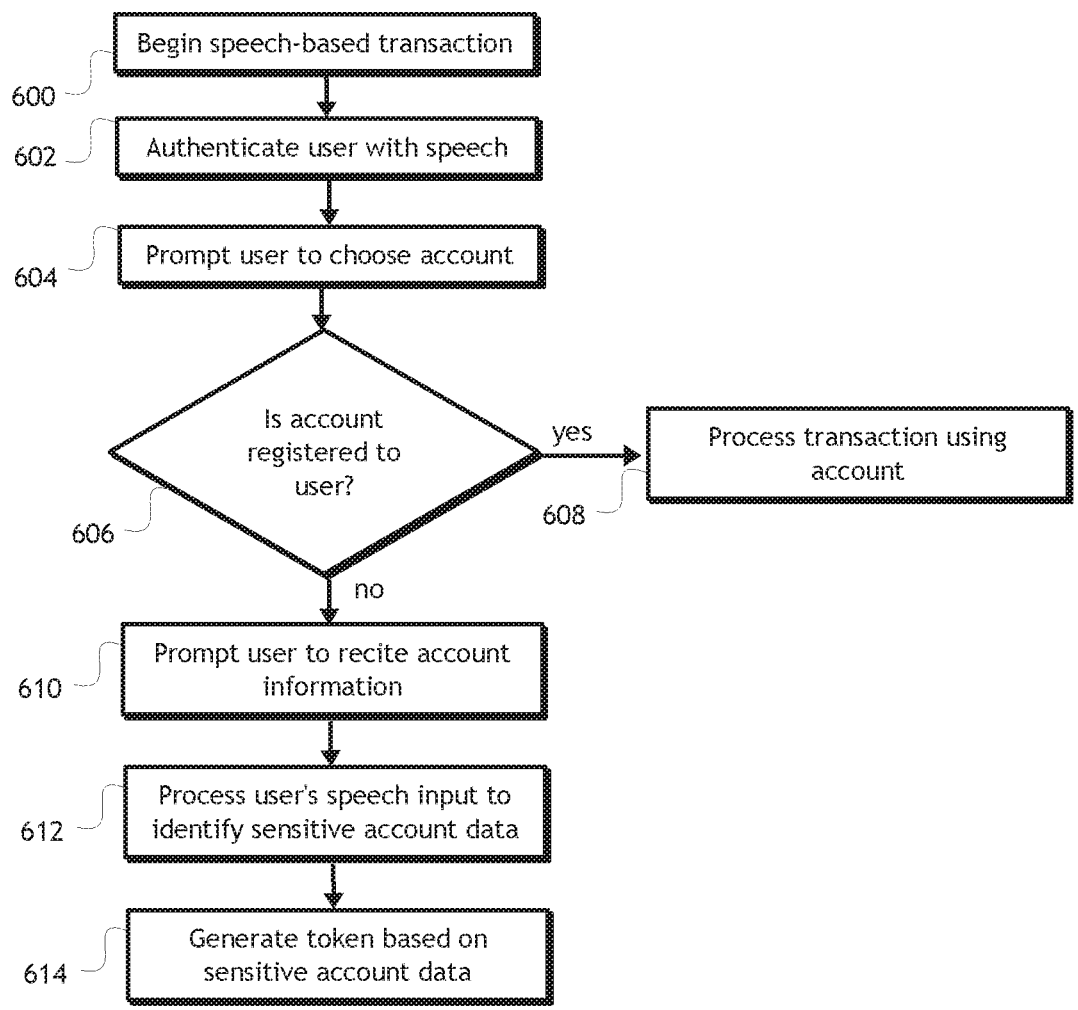
FIG. 6 is a flow diagram of a method for authenticating a voice transaction according to a non-limiting embodiment.

Referring now to FIG. 6, a flow diagram for a method of automatically encoding data in an electronic communication is shown according to a non-limiting embodiment. At a first step 600, a speech-based transaction is commenced. This may include, for example, a user requesting a transaction through a digital assistant, through a merchant website or application, at a POS system, or the like. In some examples, a user may select "pay by voice" or a similar selectable option on a merchant website. At step 602, the user may be authenticated based on the user's speech input. As an example, the user may be prompted to recite a word or phrase which, as explained here, may be used to create a biometric key for comparison with a biometric key stored for the user. Once the user is authenticated, the user may be prompted to choose an account for the transaction at step 604. As an example, the user may choose an existing account that has already been used and/or registered with the system or may choose to use a new account that has not yet been used and/or registered with the system. At step 606, it is determined whether the chosen account is already registered to the user. For example, it may be determined that the chosen account is already on file for the user and the method may proceed to step 608 to process the transaction using the chosen account.

With continued reference to FIG. 6, at step 606, if it is determined that the chosen account is not registered, the method may proceed to step 610 in which the user is prompted to recite account data such as, for example, an account identifier (e.g., PAN), expiration date, CVV code, billing address, name, and/or the like, from the user's recitation of account information. At a next step 612, the user's speech input is processed to identify sensitive account information, such as an account identifier, expiration date, and CVV code, as examples. The speech input may be parsed according to expected patterns, content, natural language, and/or the like. At step 614, a token is generated based on the sensitive account data. A transaction or interaction with a recipient system may then be carried out as explained herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for automatically encoding data in an electronic communication between a user operating a client device and a customer service agent operating a customer service system, comprising:

establishing a first communication channel between the client device and an encoding system, wherein the client device is remote from the encoding system;

establishing a second communication channel between the encoding system and a recipient system, the recipient system comprising the customer service system operated by the customer service agent, wherein the client device does not have a direct connection with the recipient system;

prompting the user, through the client device, to provide a first speech input;

authenticating the user based on the first speech input;

in response to authenticating the user, prompting the user, through the client device, to provide a second speech input;

generating textual data by processing the second speech input with a speech recognition system, the textual data including account data inputted with a microphone by the user to the client device and processed with a speech recognition system;

receiving, with the encoding system comprising at least one processor and via the first communication channel, an electronic communication comprising the textual data;

in response to receiving the electronic communication, automatically processing, with the encoding system, the textual data;

identifying, with the encoding system, the account data in the electronic communication based on processing the textual data based on one or more rules;

in response to identifying the account data in the electronic communication, generating, with the encoding system, at least one token, wherein the at least one token is unique to the account data;

modifying, with the encoding system, the textual data to generate a modified electronic communication based at least partially on the textual data and the at least one token by deleting at least a portion of the account data and replacing the at least a portion of the account data with the at least one token, the modified electronic communication comprising the at least one token;

communicating the modified electronic communication to the recipient system separate from the encoding system via the second communication channel, wherein the recipient system does not have access to the at least a portion of the account data; and receiving, from the recipient system, a transaction request comprising the at least one token;

querying at least one database based at least partially on the at least one token to identify the account data; and processing a transaction based at least partially on the transaction request and the account data.

2. The computer-implemented method of claim 1, further comprising storing, in at least one database, the at least one token and the account data.

3. The computer-implemented method of claim 1, wherein the electronic communication is a chat message.

4. The computer-implemented method of claim 1, wherein generating the at least one token comprises:

generating a random value or hashing the account data; or querying a database based on the account data to identify a copy of the at least one token that was previously generated.

5. A system for automatically encoding data in an electronic communication between a user operating a client device and a customer service agent operating a customer service system, comprising an encoding system including at least one processor programmed or configured to:

establish a first communication channel between the client device and the encoding system, wherein the client device is remote from the encoding system;

establish a second communication channel between the encoding system and a recipient system, the recipient system comprising the customer service system operated by the customer service agent, wherein the client device does not have a direct connection with the recipient system;

prompt the user, through the client device, to provide a first speech input;

authenticate the user based on the first speech input;

in response to authenticating the user, prompt the user, through the client device, to provide a second speech input;

generate textual data by processing the second speech input with a speech recognition system, the textual data including account data inputted with a microphone by the user to the client device and processed with a speech recognition system;

receive an electronic communication comprising textual data via the first communication channel;

in response to receiving the electronic communication, automatically process the textual data;

identify the account data in the electronic communication based on processing the textual data based on one or more rules;

in response to identifying the account data in the electronic communication, generate at least one token, wherein the at least one token is unique to the account data;

modify the textual data to generate a modified electronic communication based at least partially on the textual data and the at least one token by replacing at least a portion of the account data with the at least one token, the modified electronic communication comprising the at least one token;

communicate the modified electronic communication to the recipient system separate from the encoding system via the second communication channel, wherein the recipient system does not have access to the at least a portion of the account data; and receive, from the recipient system, a transaction request comprising the at least one token;

query at least one database based at least partially on the at least one token to identify the account data; and process a transaction or cause a transaction to be processed based at least partially on the transaction request and the account data.

6. The system of claim 5, further comprising at least one database, the at least one processor further programmed or configured to store, in the at least one database, the at least one token and the account data.

7. The system of claim 5, wherein the electronic communication is a chat message.

8. The system of claim 5, wherein the at least one processor generates the at least one token by:

generating a random value or hashing the account data; or querying a database based on the account data to identify a copy of the at least one token that was previously generated.

9. The system of claim 5, wherein the account data comprises a primary account number associated with a payment card.

10. A computer program product for automatically encoding data in an electronic communication between a user operating a client device and a customer service agent operating a customer service system, comprising at least one non-transitory computer-readable medium including program instructions that, when executed by at least one processor of an encoding system, cause the at least one processor to:
- establish a first communication channel between the client device and the encoding system, wherein the client device is remote from the encoding system;
- establish a second communication channel between the encoding system and a recipient system, the recipient system comprising the customer service system operated by the customer service agent, wherein the client device does not have a direct connection with the recipient system;
- prompt the user, through the client device, to provide a first speech input;
- authenticate the user based on the first speech input;
- in response to authenticating the user, prompt the user, through the client device, to provide a second speech input;
- generate textual data by processing the second speech input with a speech recognition system, the textual data including account data inputted with a microphone by the user to the client device and processed with a speech recognition system;
- receive an electronic communication comprising textual data via the first communication channel;
- in response to receiving the electronic communication, automatically process the textual data;
- identify the account data in the electronic communication based on processing the textual data based on one or more rules;
- in response to identifying the account data in the electronic communication, generate at least one token, wherein the at least one token is unique to the account data;
- modify the textual data to generate a modified electronic communication based at least partially on the textual data and the at least one token by replacing at least a portion of the account data with the at least one token, the modified electronic communication comprising the at least one token;
- communicate the modified electronic communication to the recipient system separate from the encoding system via the second communication channel, wherein the recipient system does not have access to the at least a portion of the account data; and
- receive, from the recipient system, a transaction request comprising the at least one token;
- query at least one database based at least partially on the at least one token to identify the account data; and
- process a transaction or cause a transaction to be processed based at least partially on the transaction request and the account data.

* * * * *